April 30, 1929.    H. D. STEVENS    1,711,475
APPARATUS FOR STRIPPING RUBBER TUBES FROM MANDRELS
Filed Oct. 1, 1926    17 Sheets-Sheet 1
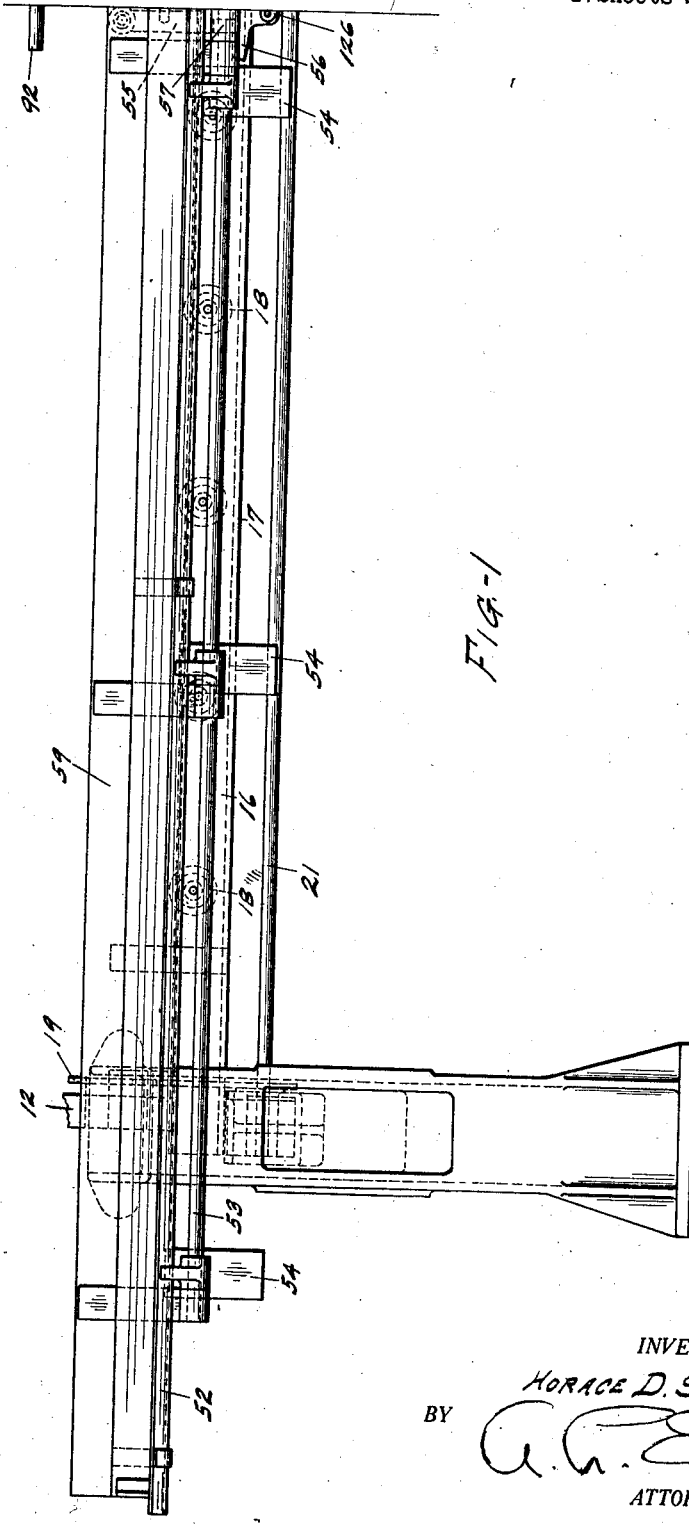
INVENTOR.
HORACE D. STEVENS
BY 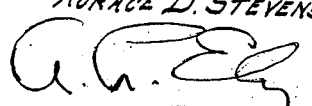
ATTORNEY.

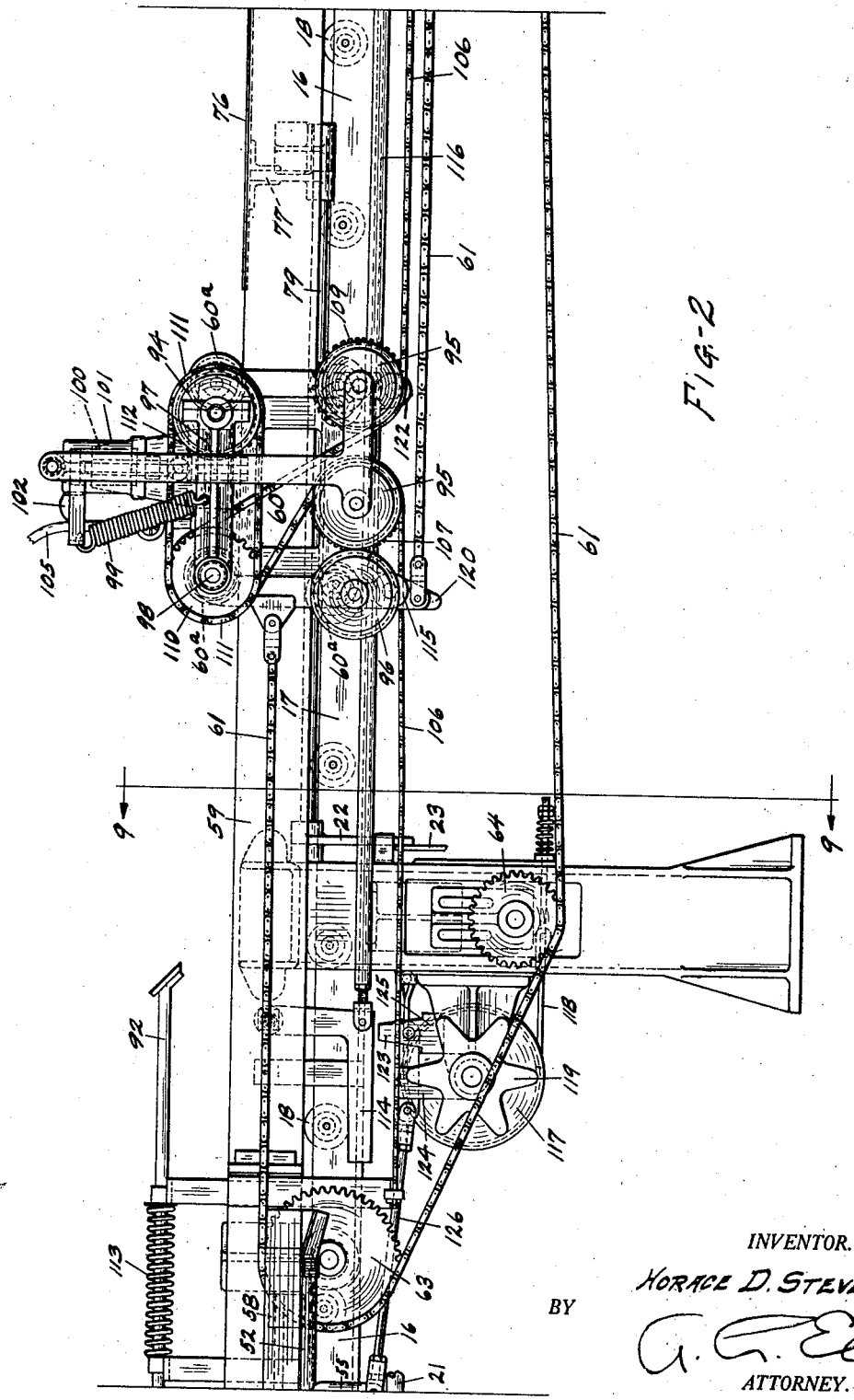

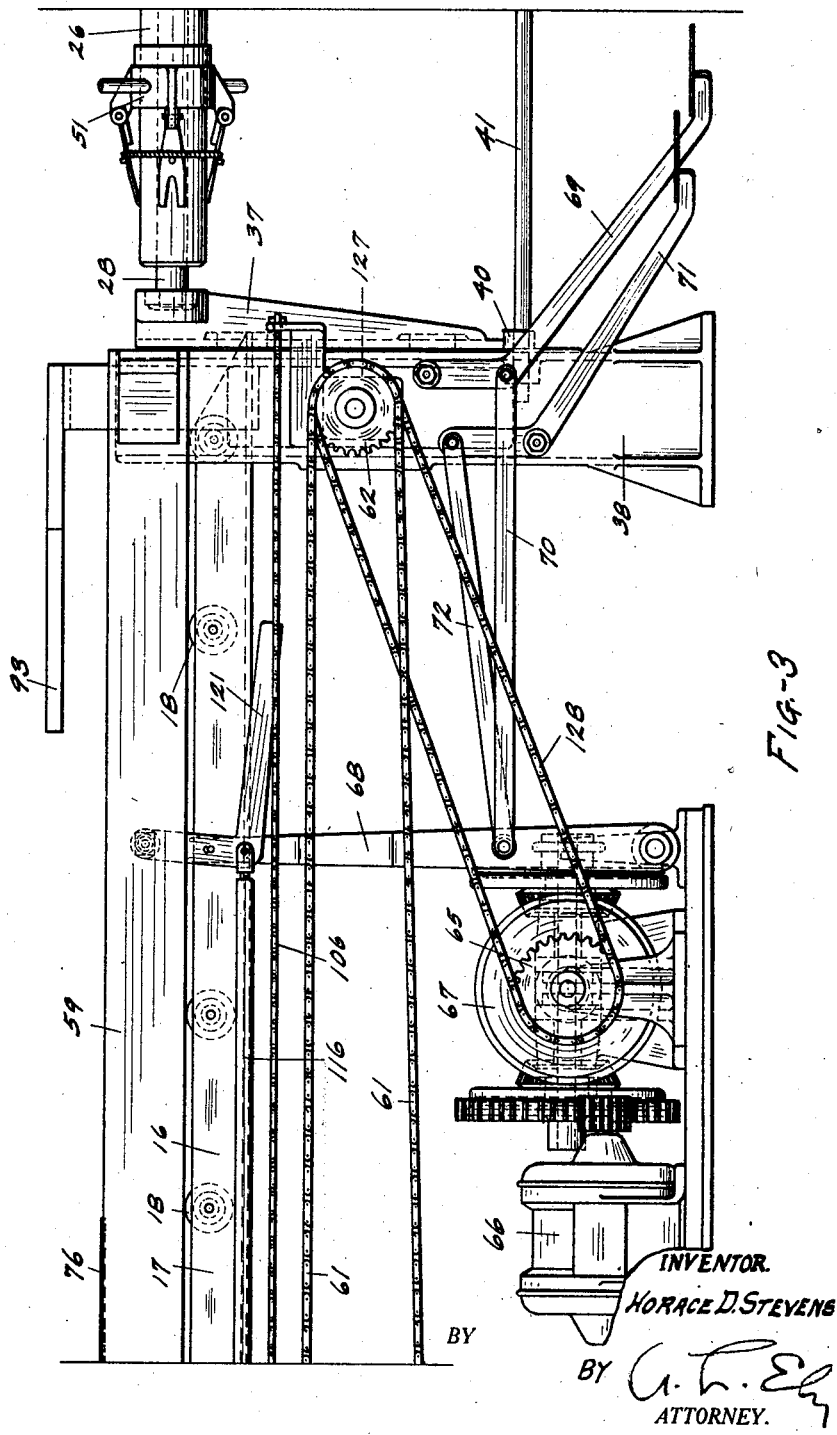

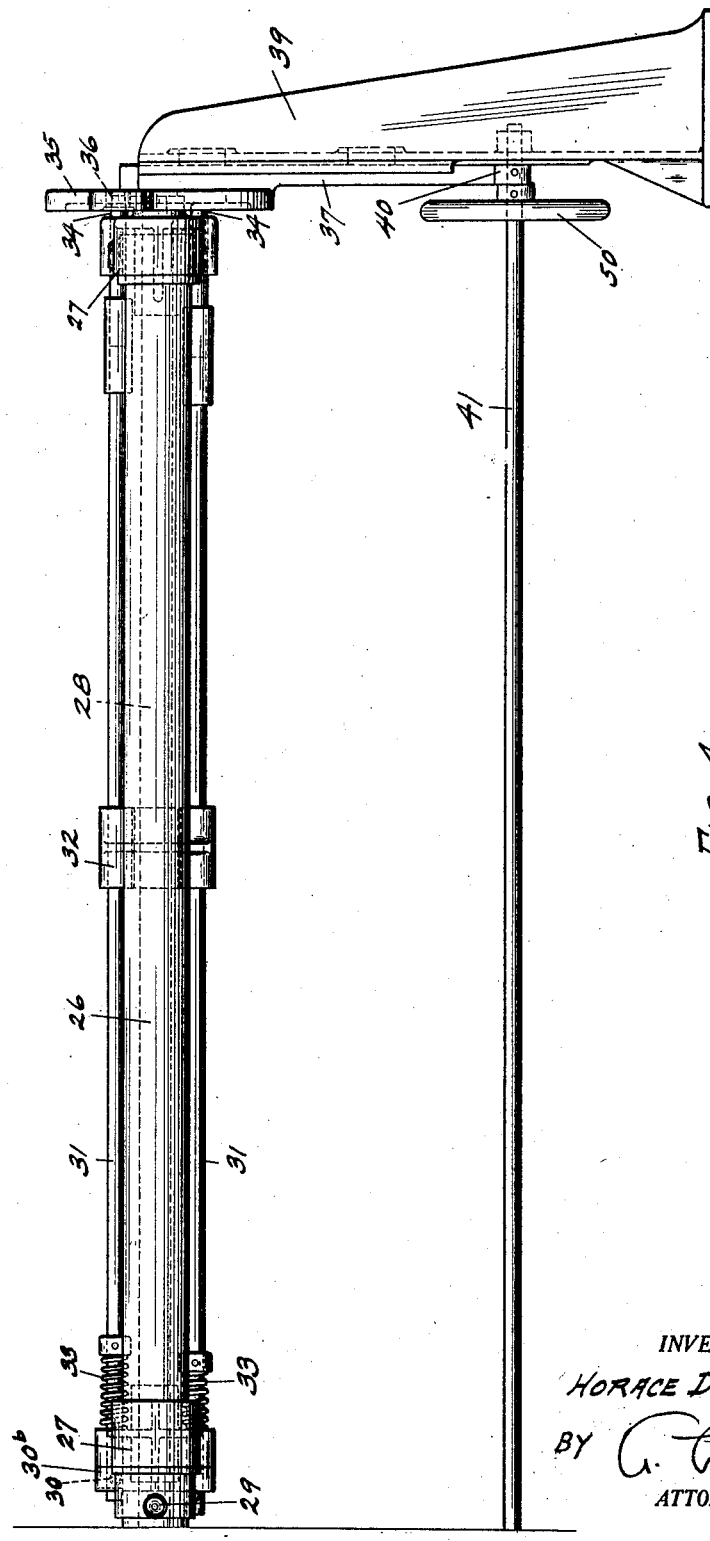

April 30, 1929.  H. D. STEVENS  1,711,475
APPARATUS FOR STRIPPING RUBBER TUBES FROM MANDRELS
Filed Oct. 1, 1926   17 Sheets-Sheet 5

INVENTOR.
HORACE D. STEVENS
BY
ATTORNEY.

April 30, 1929.  H. D. STEVENS  1,711,475
APPARATUS FOR STRIPPING RUBBER TUBES FROM MANDRELS
Filed Oct. 1, 1926  17 Sheets-Sheet 6

INVENTOR.
HORACE D. STEVENS
BY
ATTORNEY.

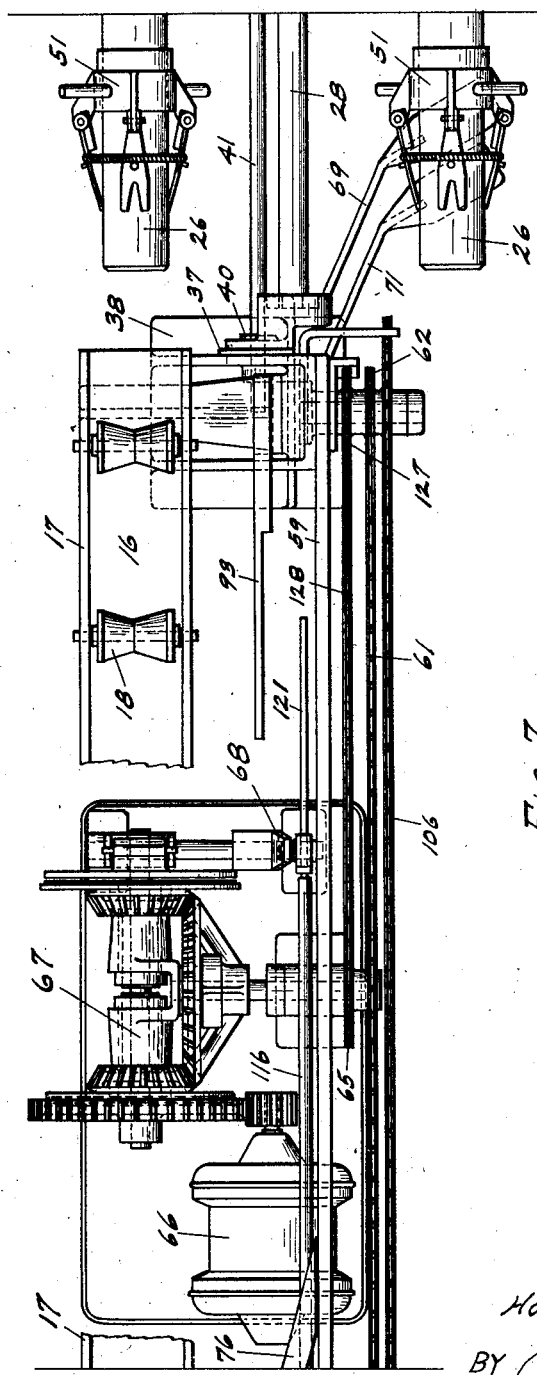

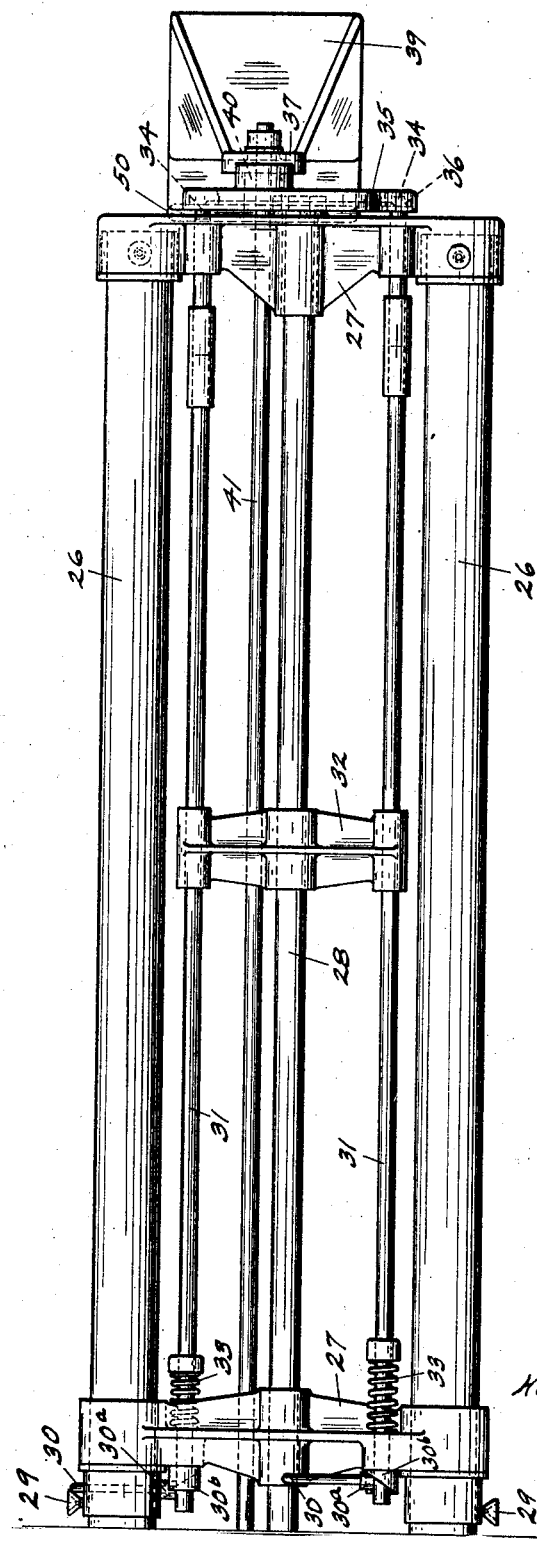

April 30, 1929.   H. D. STEVENS   1,711,475
APPARATUS FOR STRIPPING RUBBER TUBES FROM MANDRELS
Filed Oct. 1, 1926   17 Sheets-Sheet 9
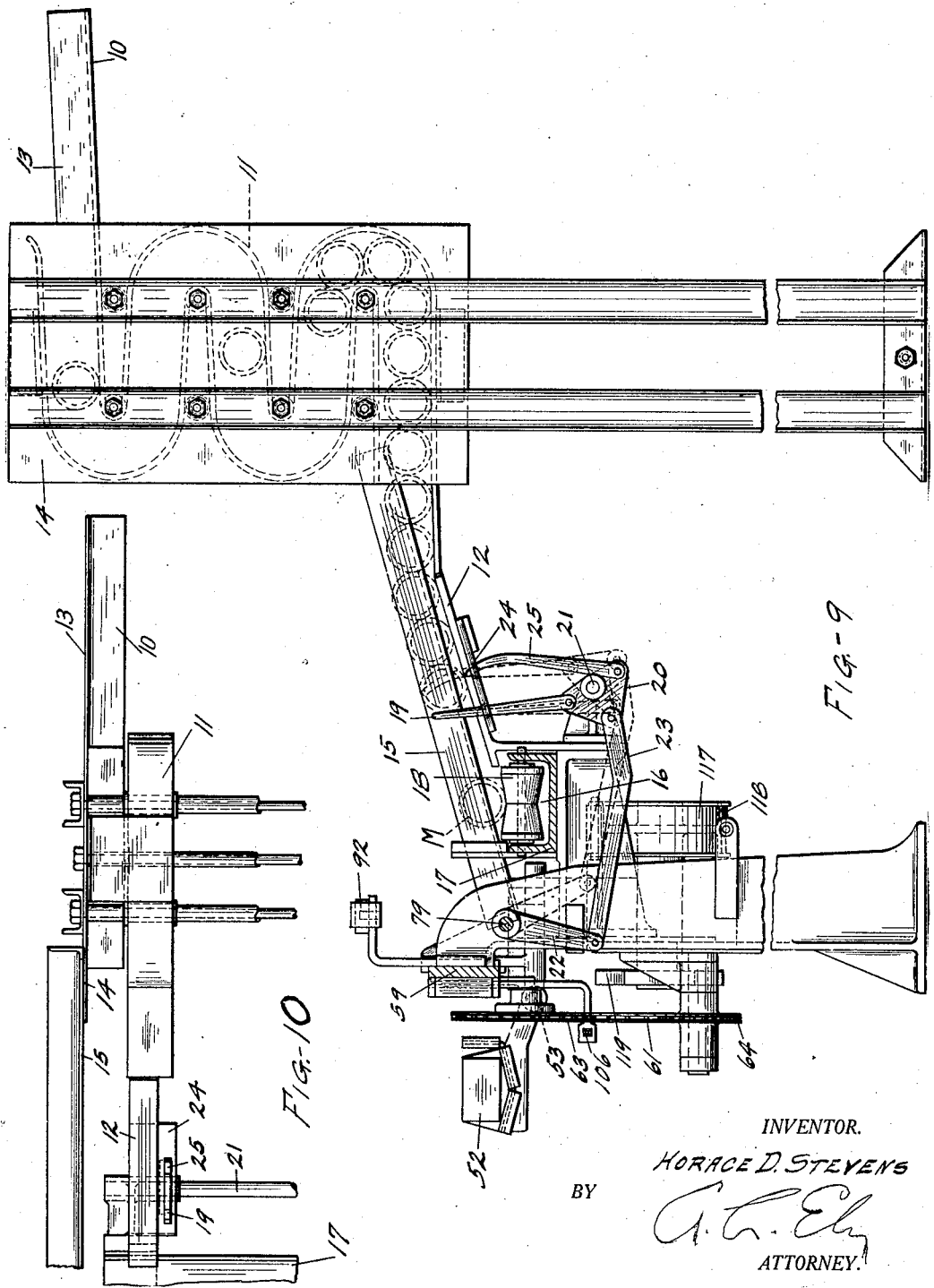
INVENTOR.
HORACE D. STEVENS
BY
ATTORNEY.

April 30, 1929.  H. D. STEVENS  1,711,475
APPARATUS FOR STRIPPING RUBBER TUBES FROM MANDRELS
Filed Oct. 1, 1926  17 Sheets-Sheet 10
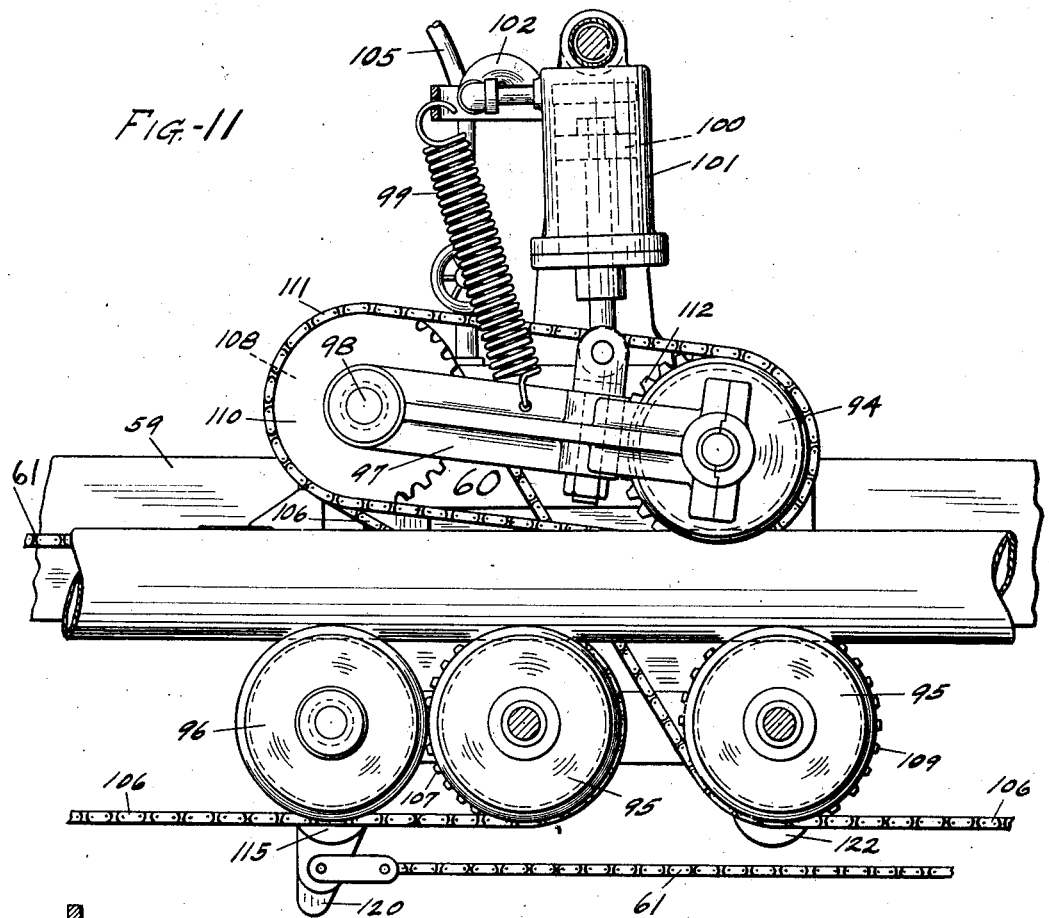
Fig.-11
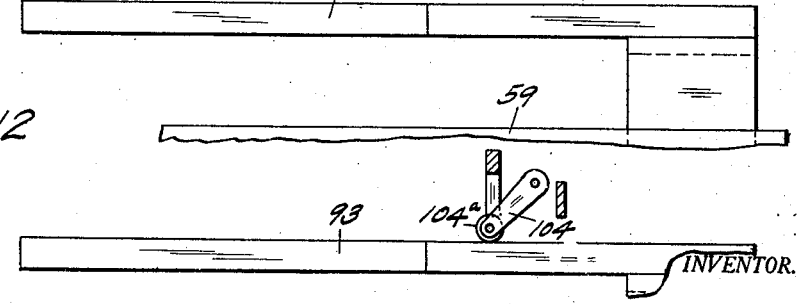
Fig.-12
Fig.-13
INVENTOR.
HORACE D. STEVENS
BY
ATTORNEY.

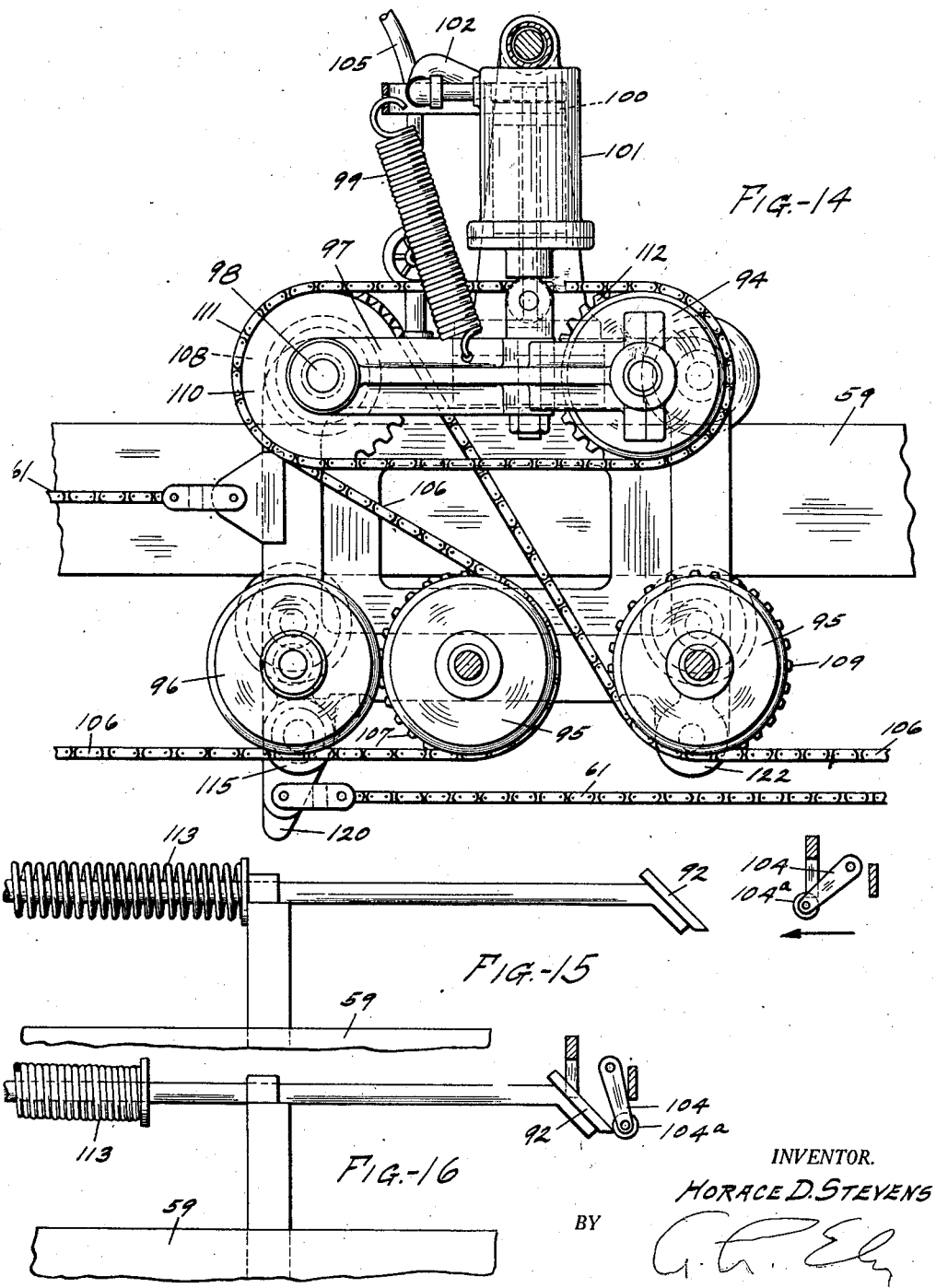

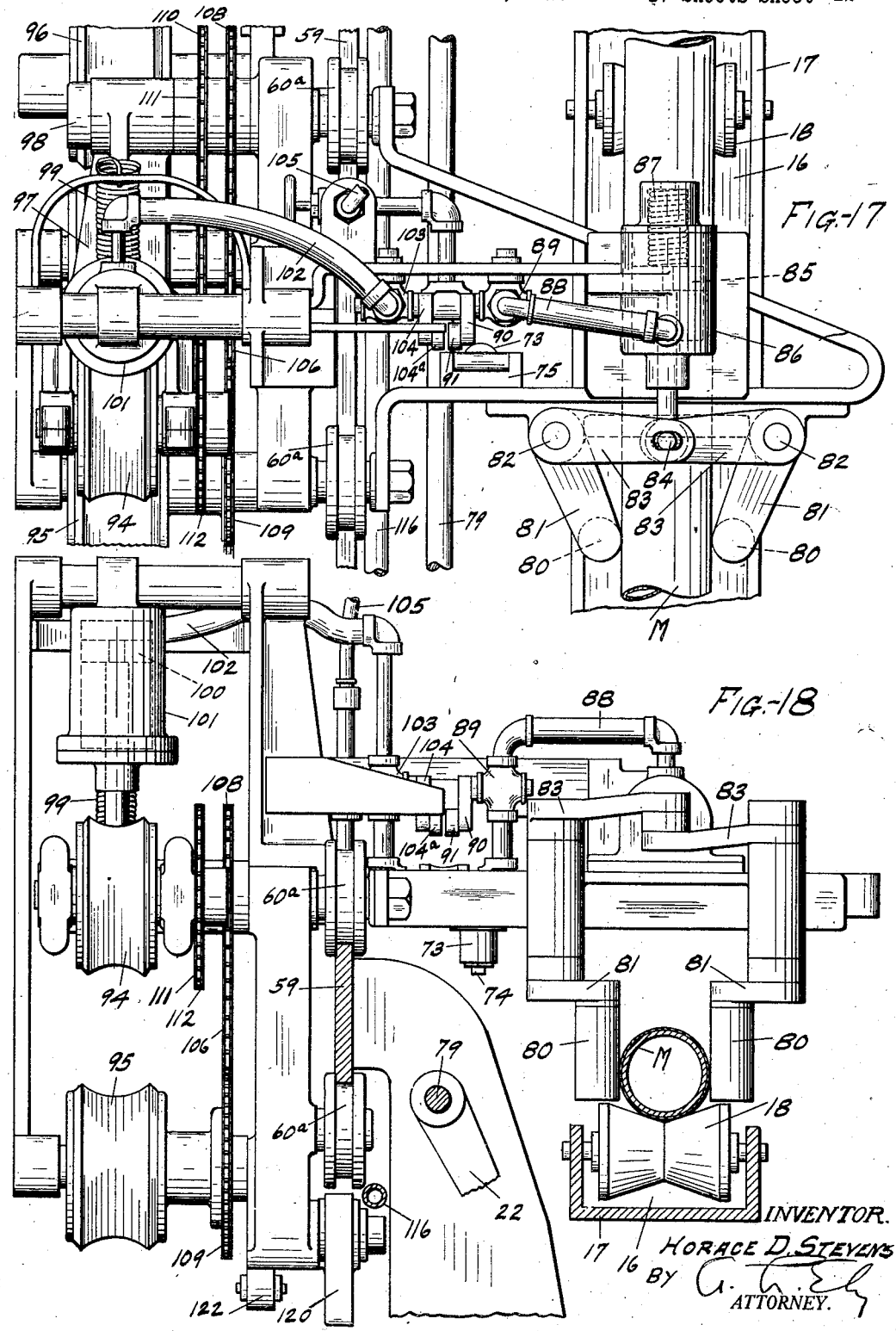

April 30, 1929.  H. D. STEVENS  1,711,475
APPARATUS FOR STRIPPING RUBBER TUBES FROM MANDRELS
Filed Oct. 1, 1926  17 Sheets-Sheet 13

INVENTOR
HORACE D. STEVENS
BY
ATTORNEY.

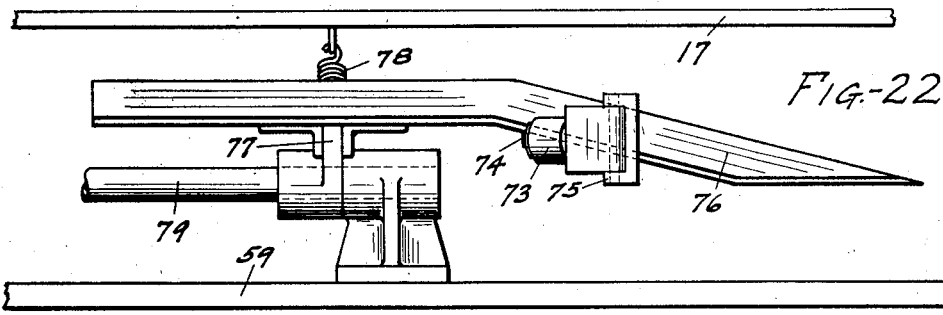
FIG.-22
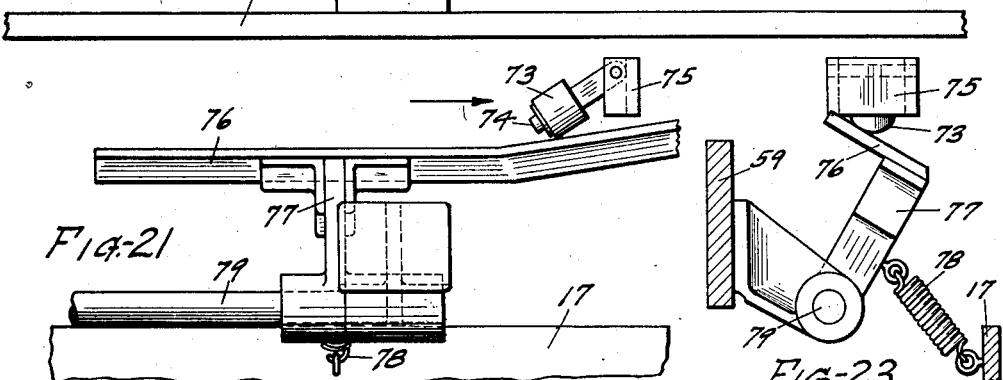
FIG.-21
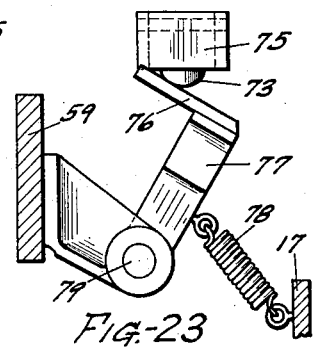
FIG.-23
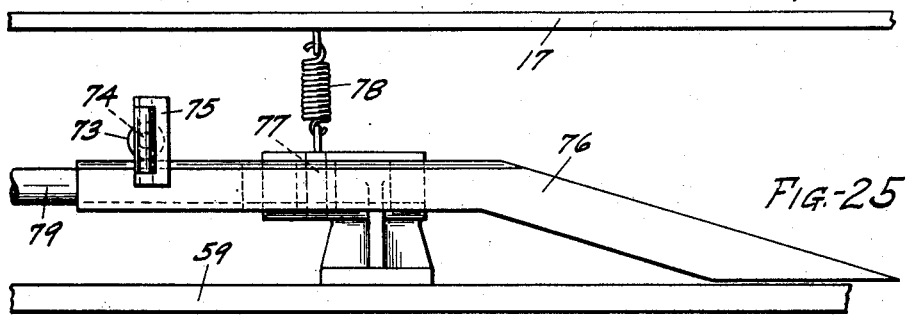
FIG.-25
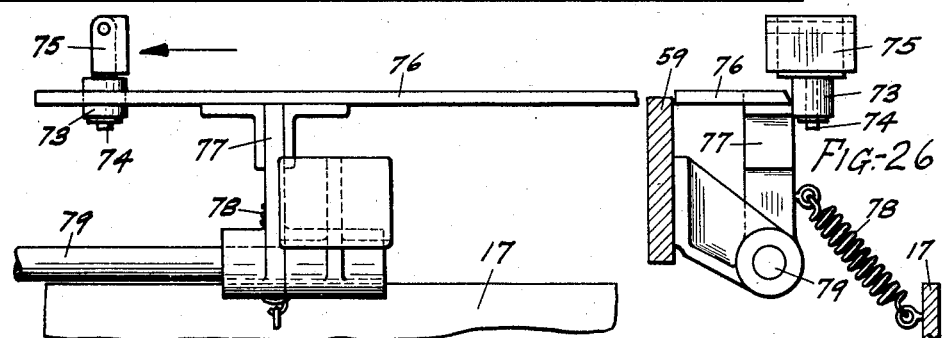
FIG.-24
FIG.-26
INVENTOR.
HORACE D. STEVENS
BY
ATTORNEY.

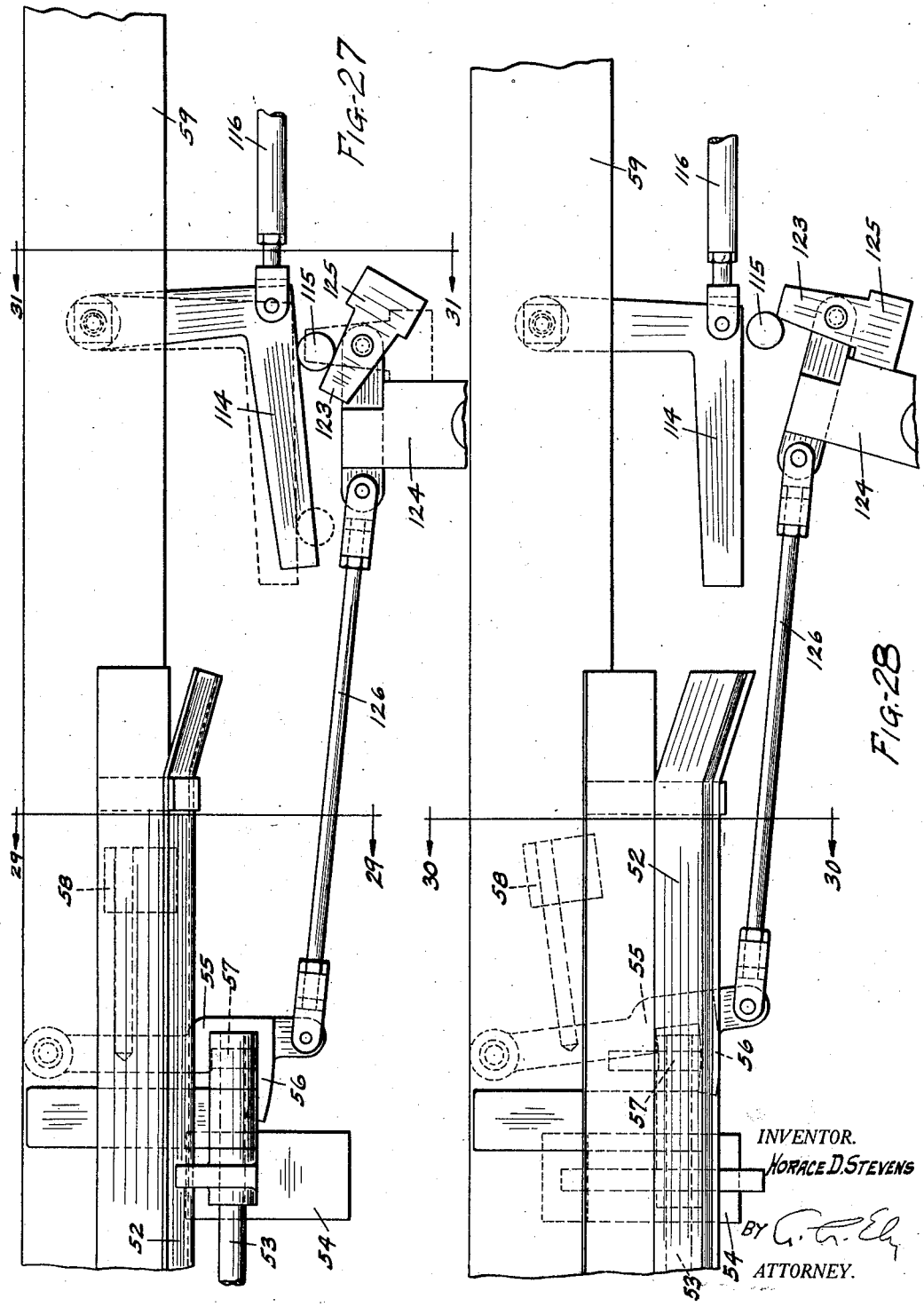

April 30, 1929.  H. D. STEVENS  1,711,475
APPARATUS FOR STRIPPING RUBBER TUBES FROM MANDRELS
Filed Oct. 1, 1926   17 Sheets-Sheet 16

INVENTOR.
HORACE D. STEVENS
BY
ATTORNEY.

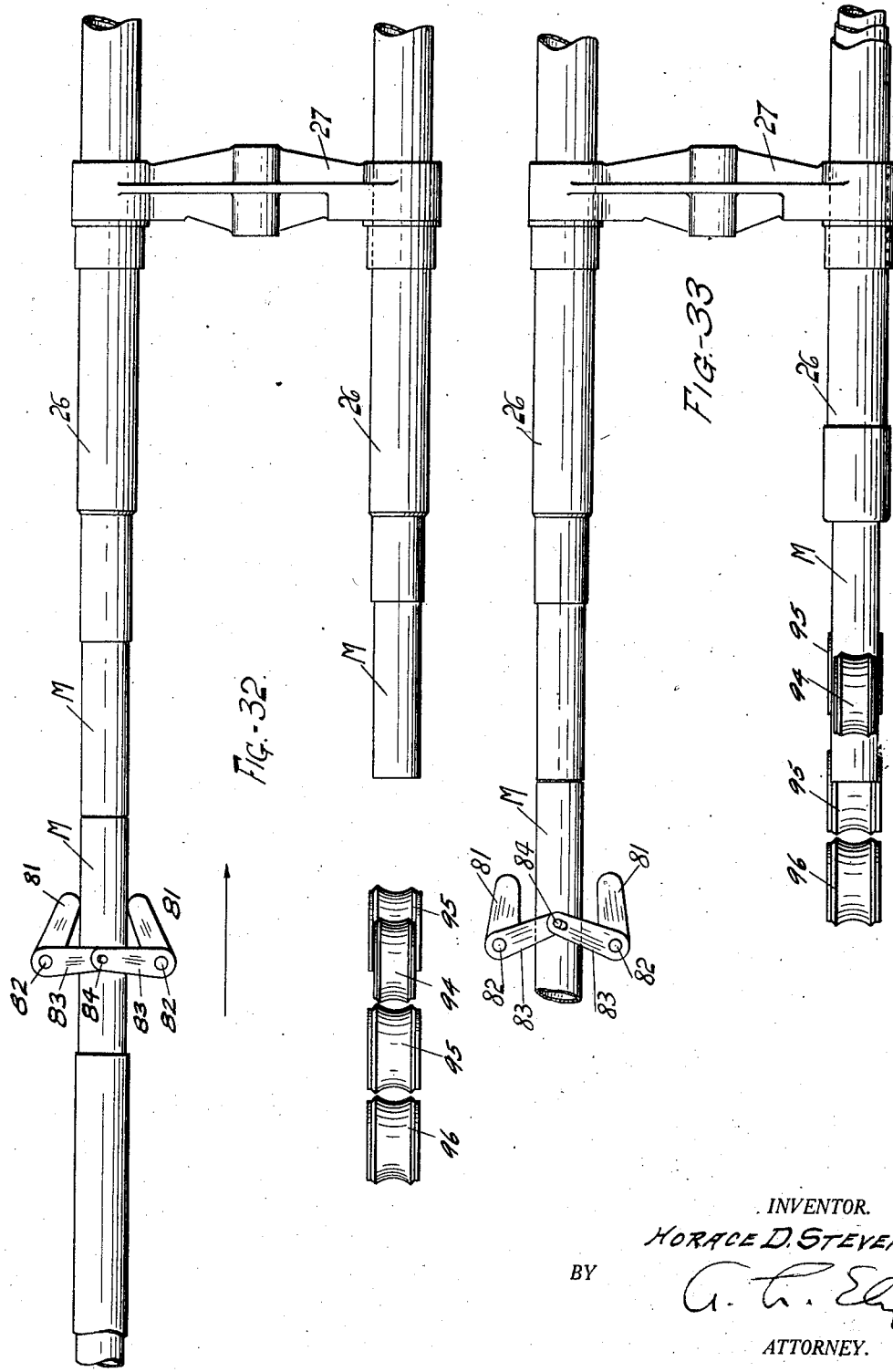

Patented Apr. 30, 1929.

1,711,475

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

APPARATUS FOR STRIPPING RUBBER TUBES FROM MANDRELS.

Application filed October 1, 1926. Serial No. 138,952.

This invention relates to apparatus for stripping rubber tubes, such as inner tubes for tires, from the mandrels upon which they are vulcanized.

The general purpose of the invention is to provide an apparatus for effectively accomplishing this operation substantially automatically and operable by a single operative.

Particularly the invention is directed to means for feeding mandrels containing the tubes into the stripping machine, improved means in the stripping machine for supplying the mandrels to the air guns, an improved mandrel gripping and transporting carriage with improved control means therefor, and means for discharging the mandrels from the machine.

The purposes of the invention are accomplished by the construction illustrated in the accompanying drawings and described below. It is to be understood that the invention is not limited to the specific form thereof shown and described.

Of the accompanying drawings,

Figures 1, 2, 3, and 4, taken together, illustrate the apparatus in elevation from the left to the right end thereof, the mandrel supply feeder being omitted;

Figures 5, 6, 7 and 8, taken together, are a plan of the apparatus from the left to the right end thereof;

Figure 9 is a section on line 9—9 of Figure 2, the mandrel supply feeder being shown;

Figure 10 is a detail plan of the rear end of the mandrel supply feeder shown in Figure 9;

Figure 11 is a detail side elevation of the mandrel gripping and transporting carriage in gripping relation on a mandrel;

Figure 5:
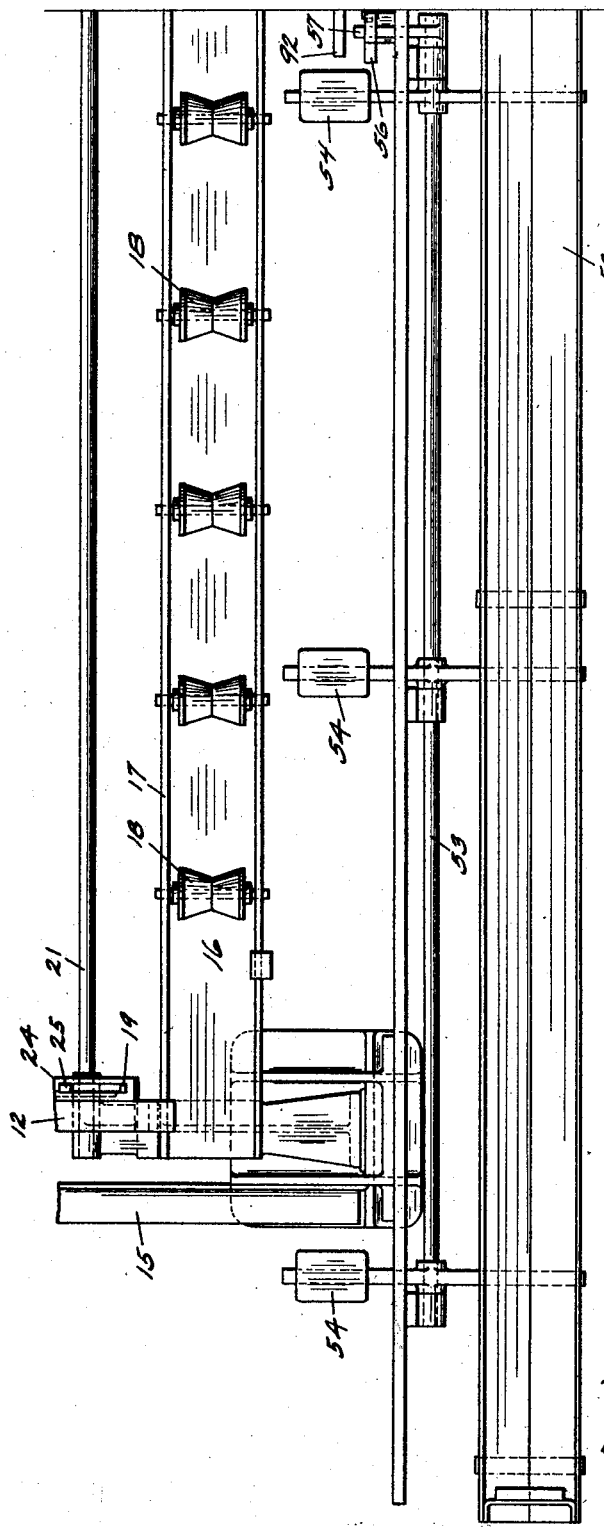
Figure 6:
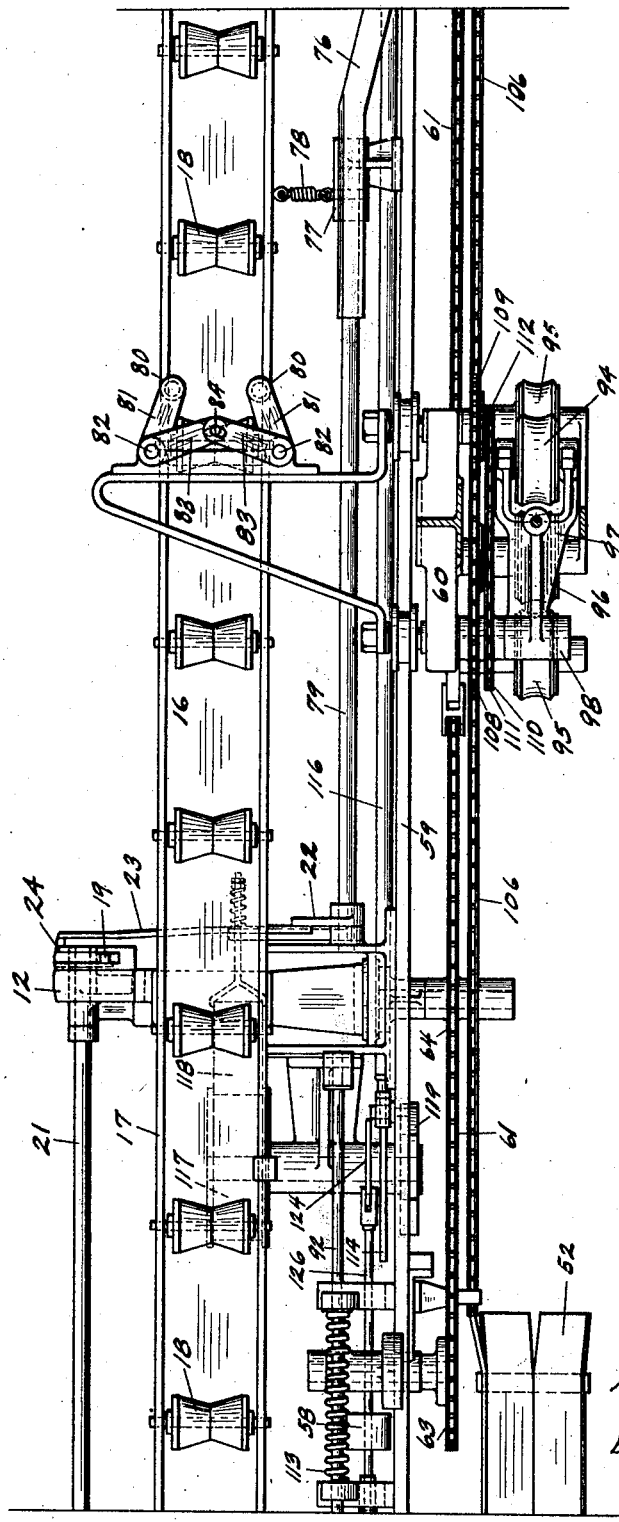
Figure 19:
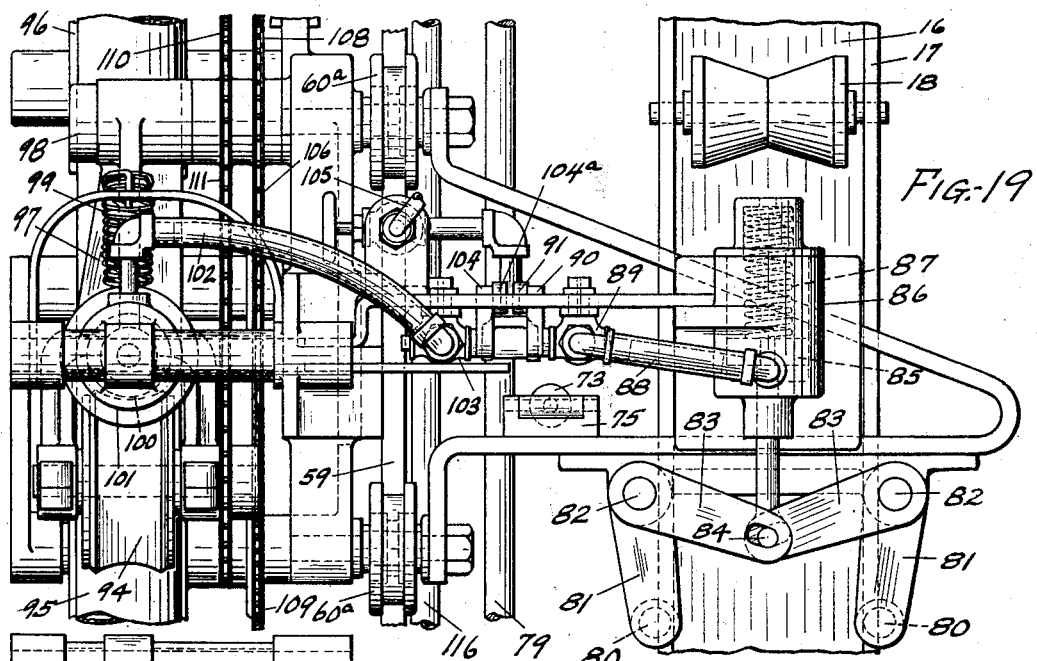
Figure 20:
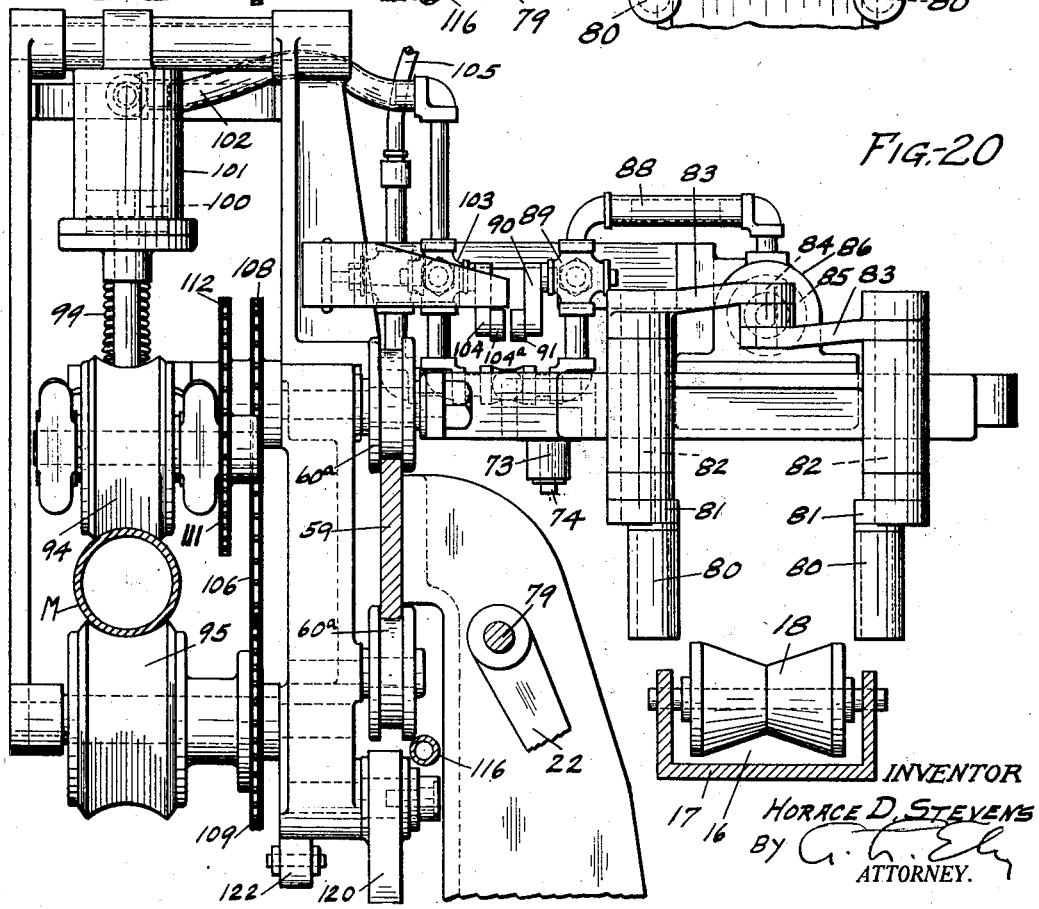
Figure 29:
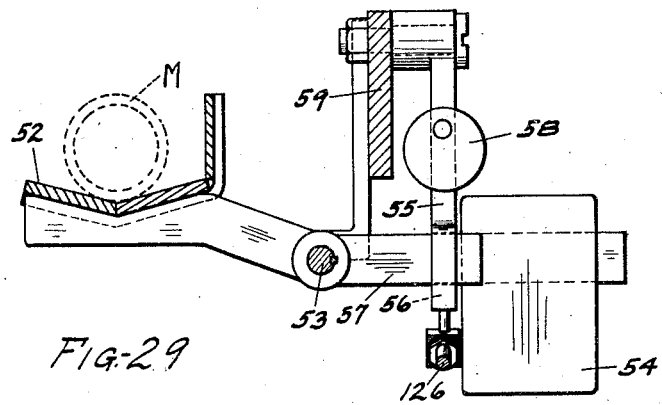
Figure 31:
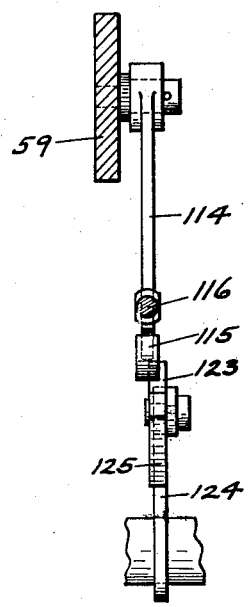
Figure 30:
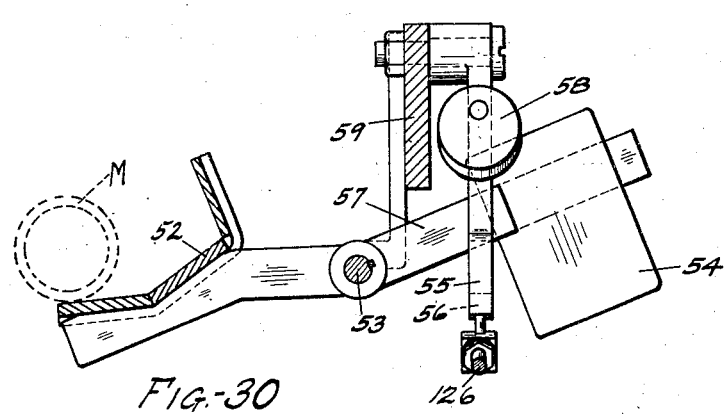
Figure 34:
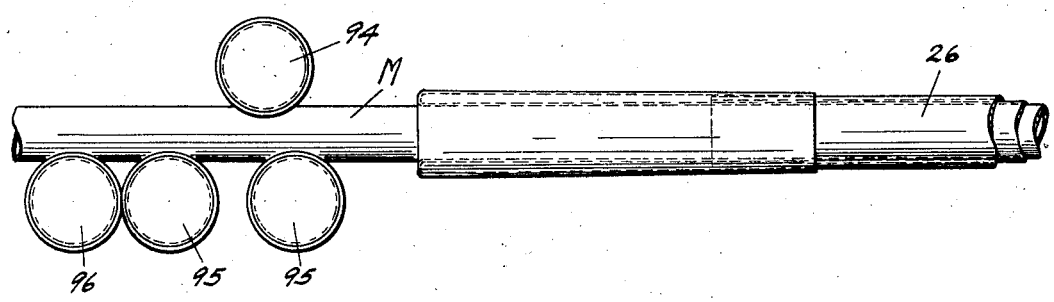

Figures 12 and 13 diagrammatically illustrate the operation of the control valve at the right end of the carriage track to operate the mandrel-gripping devices on the carriage;

Figure 14 is a side elevation of the mandrel gripping and transporting carriage with the gripping device in released position;

Figures 15 and 16 diagrammatically illustrate the operation of the control valve at the left end of the carriage track to operate the gripping device to released position;

Figure 17 is a plan and Figure 18 is a right end elevation of the carriage in its operation to the right toward the air-guns;

Figure 19 is a plan and Figure 20 is a right end elevation of the carriage in its operation to the left to pull a mandrel out of a gun;

Figure 21 is a detail side elevation, Figure 22 is a plan and Figure 23 is an end elevation showing the mechanism controlling the mandrel supply-feeding means while the carriage is traveling toward the air guns;

Figures 24, 25 and 26 are similar views illustrating this mechanism as the carriage moves away from the air guns;

Figure 27 is a detail side elevation of the operating mechanism for the discharging device shown in mandrel-receiving positions;

Figure 28 is a similar view showing the mechanism in mandrel-discharging position;

Figure 29 is a section on line 29—29 of Figure 27;

Figure 30 is a section on line 30—30 of Figure 28;

Figure 31 is a section on line 31—31 of Figure 27;

Figure 32 is a diagrammatic view illustrating the operation of the carriage feeding a mandrel into the gun and approaching a mandrel within another gun;

Figure 33 is a similar view showing the mandrel fed into the first gun and the mandrel in the other gun gripped for removal; and Figure 34 illustrates diagrammatically the stripping operation.

In general, the apparatus shown in the drawings includes a mandrel supply feeding device; a device including a series of air guns arranged to be placed successively in positions to receive a mandrel and to have a mandrel withdrawn therefrom to strip the tube; a mandrel discharging device; and a device including a traveling carriage provided with means for inserting a mandrel in a gun, means for gripping a mandrel in a gun, means for withdrawing the mandrel from the gun, means for controlling the mandrel supply feeding device and means for controlling the mandrel discharging device.

*The mandrel supply feeding device.*

This device includes spaced rails 10 on the rear of the left end of the machine, upon which mandrels M containing vulcanized tubes may be mounted, these rails being inclined forwardly to deliver the mandrels by gravity to zigzag gravity tracks 11, 11 in turn adapted to deliver the mandrels to gravity storage tracks 12, 12. Guide rails 13, 13, guards 14, 14 and guide rail 15 are arranged to guide the mandrels on tracks 10, 11 and 12. Tracks 12 are arranged to deliver the mandrels upon a supporting conveyor 16, comprising a channel 17 having spaced longitudinally along the same a series of freely rotatable mandrel supporting and centering spools 18, 18.

Mechanism is provided so that mandrels will be deposited in succession on conveyor 16 after a mandrel is withdrawn therefrom for insertion into an air gun. This mechanism includes dogs 19, 19 arranged so as normally to project into the path of mandrels on tracks 12 to retain the mandrels on these tracks, these dogs being pivotally connected to eccentrics 20, 20 upon a shaft 21 adapted to be operated by arm 22 through link 23. Dogs 19 are guided in slots in plates 24, 24 secured upon the under sides of tracks 12. Eccentrics 20 have pivoted thereon other dogs 25, 25 also projecting through slots in plates 24 and normally out of the path of mandrels on track 12, but arranged to be temporarily projected into said path so as to permit only one mandrel to descend upon conveyor 16 when dogs 19 are withdrawn from said path. The foregoing mechanism is controlled by the stripper carriage in a manner to be described.

The air gun mechanism.

This mechanism comprises a series of guns (in this case two) indicated at 26, 26 mounted in spaced spiders 27, 27 journaled on a shaft 28. Guns 26 are hollow cylinders closed at their right ends and open at their left ends and of such length that a mandrel may be inserted therein with an end of the mandrel and a portion of the tube projecting from the end of the gun so that the tube can be cuffed over the end of the gun as shown in Figure 33. Each gun has an aperture adjacent its open end over which is a socket member 29 into which an air pressure supply nozzle may be inserted by the operative to supply air to the interior of the gun.

The series of guns are adapted to be manually rotatable by hand levers 30, 30. In order to align the guns properly, latching devices are provided to lock the guns and to be released by operation of levers 30 at the left end of the air gun device. To this end these levers are connected to shafts 31, 31 journaled in spiders 27, 27 and a central spider 32 on shaft 28, which shafts 31 are normally urged to the right by springs 33, 33 so that their ends at 34, 34 bear against a fixed disc 35 in which is an aperture at 36. The aperture 36 is arranged to receive the end 34 of a shaft 31 when a gun 26 is aligned with the gripping device of the stripping carriage, to be described, and when a second gun 26 is aligned with conveyor 16, a spring 33 urging the shaft into said aperture. To release this latch when the guns are rotated to another position, each lever 30 has a follower 30$^a$ thereon engaged on a cam 30$^b$ on the left end spider 27 so formed as to urge shaft 31 to the left to remove its end from socket 36.

Guns 26 are removably mounted in spiders 27 to be replaceable by guns of different sizes for use in stripping mandrels of different sizes. To the end that the device may be adjusted to realign different sizes of guns with the conveyor 16 and the stripping carriage, shaft 28 is journaled in slides 37, 37 vertically slidable on standards 38 and 39 and vertically adjustable by cams 40, 40 on a shaft 41 journaled in brackets 38 and 39 and operable by means of a hand wheel 50. Guns 26 carry on their muzzles a known type of cuffing device 51.

The mandrel discharging device.

This device includes a forwardly tiltable receptacle 52 arranged in alignment with the travel of the stripping carriage to receive the mandrel therefrom. This receptacle is pivoted on the machine frame by a shaft 53 and is normally held in mandrel receiving position by means of counter-weights 54, 54, but is adapted to be tilted by the weight of a mandrel thereon.

A latch 55 provided with an arm 56 engaging under an arm 57 secured on shaft 53 is provided for locking receptacle 52 against tilting, latch 55 being normally urged into locked position by a counterweight 58. Mechanism later to be described is arranged to be controlled by the stripping carriage to release the latch as the carriage moves from its mandrel-releasing position back toward the guns to grip another mandrel.

The stripping carriage.

All of the operations of the machine are controlled by this carriage in its movements from mandrel gripping to mandrel releasing positions. A rail 59 is supported so as to extend longitudinally along the front of the machine and the carriage 60 supported thereon by rollers 60$^a$, 60$^a$ is operable along the rail in either direction by a chain 61, the ends of which are connected to the carriage, and which is trained over a drive sprocket 62 at one end of rail 59, an idler sprocket 63 at the other end thereof and an adjustable chain-tensioning sprocket 64.

Sprocket 62 may be driven in either direction by means of a sprocket 127 integral therewith, over which is trained a chain 128 driven by a sprocket 65 adapted to be driven in either direction by a motor 66 through a standard type of forward and reverse transmission indicated at 67, the forward and reverse clutches of which are controllable by a lever 68 operable in one direction by a pedal 69 through a link 70 and in the other direction by a pedal 71 through a link 72.

For controlling the mandrel supply feeding conveyor, the carriage 60 carries a roller 73 journaled on a pin 74 secured in a hinge member 75 adapting the roller 73 to swing freely in one direction so as to be ineffective upon operation of the carriage toward the guns, but to be held against swinging in the other direction so that it will engage a cam rail 76 as the carriage moves away from the guns and causes arm 77, on which the cam rail is supported, to swing upwardly and forwardly (Figure 26) against the action of a spring 78, arm 77 being secured on a shaft 79 upon which lever arm 22 (Figure 9) is secured.

Carriage 60 is adapted for inserting a mandrel into a gun by providing thereon grippers 80, 80 arranged to travel over conveyor 16 and movable toward and from each other for gripping or releasing a mandrel by being secured upon arms 81, 81 secured to shafts 82, 82 operable by cranks 83, 83 having longitudinally slotted ends engaging over a common crank pin 84. Crank pin 84 is operable by a piston 85 in a cylinder 86 and grippers 80 are normally urged into non-gripping relation by a spring 87 effective upon said piston in said cylinder. Fluid under pressure may be supplied cylinder 86 to operate piston 85 through a conduit 88, control of the supply being afforded by a valve 89 therein operable by a trip lever 90 having a roller 91 thereon for engaging a cam rail 92 at the left end of the machine to engage the grippers upon a mandrel and a cam rail 93 at the right end of the rail 59 to disengage the grippers from the mandrel.

The mandrel gripping and transporting mechanism arranged on the carriage 60 for performing the stripping operation comprises mandrel gripping and driving rollers 94 and 95, 95 and an idler supporting roller 96. Roller 94 is operable downwardly to grip a mandrel by being journaled upon an arm 97 pivoted on carriage 60 at 98 and normally urged upwardly by a spring 99. A piston 100 in a cylinder 101 is arranged to urge roller 94 downwardly, fluid under pressure being connected to said cylinder through a conduit 102 and controlled by a valve 103 operable by a lever 104 having a roller 104ª adapted to engage cam rail 93 to connect fluid under pressure to said cylinder and to engage cam rail 92 to disconnect said pressure therefrom. Supply of air to carriage 60 may be effected through a flexible supply pipe 105.

Rollers 94 and 95 are arranged to be driven so that the mandrel may be projected at a greater rate and over sufficient distance effectively to complete the stripping operation with a minimum of momentum to be overcome to start and stop the carriage and a minimum period of travel of the carriage, whereby the maintenance of the device will be low and the stripping operation quickly performed. To this end a chain 106, fixed at its ends to the opposite ends of the rail 59, is trained over a sprocket 107 integral with one roller 95, over a sprocket 108 journaled on pivot 98 and over a sprocket 109 integral with the other roller 95, sprocket 108 having a sprocket 110 integral therewith over which is trained a chain 111 for driving a sprocket 112 integral with roller 94.

Cam rail 92 is mounted so as to be longitudinally shiftable to the left and is urged to the right by a spring 113 so as to act as a yielding bumper for retarding the movement of carriage 60 as it approaches the limit of its movement toward the left end of the machine. For stopping the carriage at this end, a cam lever 114 is arranged to be engaged by a stud 115 on carriage 60 to operate lever 68 to a neutral position through connecting rod 116. A brake drum 117, over which is tensioned a brake band 118, is arranged to be effective to stop carriage 60 upon disconnection of the drive therefrom at the left end of the rail 59 by arranging a star wheel 119 integral with the drum 117 with points of the star in the path of a lug 120 on the lower side of carriage 60. Stopping of the carriage at the right end of rail 59 is effected by a cam lever 121 having a pin and slot connection with lever 68 and operable by a stud 122 on carriage 60.

To operate the mechanism for unlatching table 52 so that it will tilt under the weight of a mandrel, a dog 123 is pivoted on an arm 124 so as normally to project into the path of stud 115 on carriage 60 (see Figures 27 and 28) and to swing ineffectively on arm 124 under the action of stud 115 as carriage 60 approaches its left end limit, but having a portion 125 thereon arranged to abut arm 124 to prevent such swinging on the arm 124 under action of the stud 115 as the carriage moves away from its left terminal. Arm 124 is thus adapted through link 126 to disengage latch 55, all of the above parts being returned to their normal positions as soon as stud 115 disengages dog 123 by action of counterweights 58.

*The operation.*

Mandrels containing vulcanized tubes are supplied to the machine by the operatives performing the unwrapping or other operations incident to the vulcanizing operation. The carriage 60, as it approaches the end of its travel remote from the guns, deposits a mandrel in receptacle 52 and operates mandrel grippers to grip a mandrel on conveyor 16. The operative then starts the carriage toward the guns, whereby it operates the latch permitting table 52 to tilt to discharge a stripped mandrel, and also operates the dogs, as will be understood, to deposit another mandrel on conveyor 16, and in addition, carries the mandrel fed onto conveyor 16 along the conveyor, pushing ahead of it a mandrel which has been brought into proximity to the gun 26 on the preceding trip. The grippers 80 are released from the mandrel at the right end of its travel, so that this mandrel is placed in proximity to the gun and the mandrel ahead is pushed into the gun aligned with conveyor 16 as shown in Figures 32 and 33. At the same time a mandrel in another gun aligned with the gripping and transporting rollers is gripped thereby, the operative having previously cuffed a tube over the end of this gun as shown in Figure 33 by the use of device 51.

The operative then simultaneously inserts a pressure supply nozzle in socket 29 and operates the machine to move carriage 60 away from the guns, the cuffed portion of the tube being held upon the gun by hand. The mandrel is drawn out of the gun by the carriage and deposited in receptacle 52, the tube being reversed by this operation and air under pressure from the guns being maintained between the reversed portion of the tube and the mandrel throughout the stripping operation.

At the completion of each stripping operation, the operative turns the series of guns 26 on spiders 27 to a position with one gun containing a mandrel in a position ready to be stripped and with an empty gun aligned with conveyor 16 to receive another mandrel therefrom.

Modifications of the invention may be resorted to without departing from the spirit thereof or the scope of the appended claims.

What is claimed is:

1. Apparatus for stripping rubber tubes from mandrels, said apparatus including means for supporting a mandrel thereon, means for supplying mandrels in succession to the supporting means, stripping guns arranged to receive the mandrels in succession from the supporting means and adapted to move said mandrels in succession to a stripping position, a reciprocable carriage movable toward and from the guns, grippers carried by the carriage adapted to grip a mandrel on the supporting means as the carriage approaches the limit of motion away from the guns, also adapted to insert said mandrel into a gun as the carriage approaches the guns, and further adapted to release the mandrel as it reaches its limit of motion toward the guns, mandrel gripping and transporting rollers carried by the carriage for pulling a mandrel from the gun, said rollers being adapted to be actuated into gripping relation as the carriage reaches its limit of motion toward the guns and adapted to be released as the carriage reaches its limit of motion away from the guns, a tiltable receptacle upon which the carriage deposits the mandrels in succession, said receptacle normally tending to remain upright but adapted to tilt under the weight of a mandrel, a latch for normally holding the receptacle against tilting, means operable by the carriage for actuating the mandrel-supplying means as the carriage moves toward the guns, and means operable by the carriage for releasing the latch as the carriage moves toward the guns.

2. Apparatus for stripping rubber tubes from mandrels, said apparatus including means for supporting a mandrel thereon, means for supplying mandrels in succession to the supporting means, stripping guns arranged to receive the mandrels in succession from the supporting means and adapted to move said mandrels in succession to a stripping position, a reciprocable carriage movable toward and from the guns, means on the carriage for conveying a mandrel from the supporting means into a gun, means on the carriage for pulling a mandrel from a gun, means for receiving the stripped mandrel and discharging it from the machine, means operable by the carriage for actuating the mandrel-supplying means, and means operable by the carriage for operating the mandrel-receiving means to discharge a mandrel therefrom.

3. In apparatus for stripping rubber tubes from mandrels, the combination with a reciprocal mandrel stripping carriage, of means for supplying mandrels in succession to be stripped, said means being controlled by movement of the carriage and including a gravity conveyor, dogs arranged to be alternately projected into the path of mandrels on the conveyor to release one at a time therefrom, and mechanism for operating the dogs including an actuating member in the path of the carriage and means on the carriage effective upon the actuating member, said last named means and said member being arranged to cooperate to operate the mechanism by movement of the carriage in one direction only.

4. In apparatus for stripping rubber tubes from mandrels, the combination with a reciprocable mandrel stripping carriage, of means for supplying mandrels in succession to be stripped, said means being controlled by movement of the carriage and including a gravity conveyor, dogs arranged to be alternately projected into the path of mandrels on the conveyor to release one at a time therefrom, and mechanism for operating the dogs including an actuating member in the path of the carriage and means on the carriage effective upon the actuating member.

5. In apparatus for stripping rubber tubes from mandrels, the combination with a reciprocable mandrel stripping carriage, of means for supplying mandrels in succession to be stripped, said means being controlled by movement of the carriage and including a gravity conveyor, dogs arranged to be alternately projected into the path of mandrels on the conveyor to release one at a time therefrom, and mechanism for operating the dogs.

6. In apparatus for stripping rubber tubes from mandrels, the combination with a reciprocable mandrel stripping carriage, of means for supplying mandrels in succession to be stripped, said means being controlled by movement of the carriage.

7. In apparatus for stripping rubber tubes from mandrels, the combination with a reciprocable mandrel stripping carriage, of means for discharging stripped mandrels from the machine controlled by movement of said carriage, said means comprising a tiltable receptacle normally tending to remain upright but adapted to tilt under the weight of a mandrel, means for normally holding the receptacle against tilting, and means operable by the carriage for temporarily releasing the holding means, said holding means being adapted to return to its normal position upon disengagement of the carriage therewith.

8. In apparatus for stripping rubber tubes from mandrels, the combination with a reciprocable mandrel stripping carriage, of means for discharging stripped mandrels from the machine controlled by movement of said carriage, said means comprising a tiltable receptacle normally tending to remain upright but adapted to tilt under the weight of a mandrel, means for normally holding the receptacle against tilting, and means operable by the carriage for temporarily releasing the holding means.

9. In apparatus for stripping rubber tubes from mandrels, the combination with a reciprocable mandrel stripping carriage, of means for discharging stripped mandrels from the machine controlled by movement of said carriage, said means comprising a tiltable receptacle normally tending to remain upright but adapted to tilt under the weight of the mandrel.

10. In apparatus for stripping rubber tubes from mandrels, the combination with a reciprocable mandrel stripping carriage, of means for discharging stripped mandrels from the machine controlled by movement of said carriage.

11. In apparatus for stripping rubber tubes from mandrels, the combination with a rotatable mounting carrying a series of replaceable guns, of a carriage reciprocable toward and from said guns to insert a mandrel in one and to remove a mandrel from another, said mounting being adjustable relatively with respect to the line of travel of the carriage so that guns of different sizes may be properly aligned therewith.

12. In apparatus for stripping rubber tubes from mandrels, the combination with a rotatable mounting carrying a series of replaceable guns, of a carriage reciprocable toward and from said guns to remove one of said guns, said mounting being adjustable relatively with respect to the line of travel of the carriage so that guns of different sizes may be properly alinged therewith.

HORACE D. STEVENS.